(12) United States Patent
Xu et al.

(10) Patent No.: US 12,078,566 B2
(45) Date of Patent: Sep. 3, 2024

(54) PRESSURE MEASUREMENT DEVICE

(71) Applicant: Fluke Corporation, Everett, WA (US)

(72) Inventors: Fudong Xu, Shanghai (CN); Hui Wang, Shanghai (CN); Shaolin Xia, Shanghai (CN); Songnan Fan, Shanghai (CN); Shounan Luo, Shanghai (CN)

(73) Assignee: Fluke Corporation, Everett, WA (US)

( * ) Notice: Subject to any disclaimer, the term of this patent is extended or adjusted under 35 U.S.C. 154(b) by 96 days.

(21) Appl. No.: 17/538,792

(22) Filed: Nov. 30, 2021

(65) Prior Publication Data
US 2022/0170806 A1 Jun. 2, 2022

(30) Foreign Application Priority Data

Nov. 30, 2020 (CN) .......................... 202011374514.5

(51) Int. Cl.
*G01L 7/04* (2006.01)
(52) U.S. Cl.
CPC .............. *G01L 7/041* (2013.01); *G01L 7/048* (2013.01)
(58) Field of Classification Search
CPC ................................ G01L 7/28; G01L 27/005
See application file for complete search history.

(56) References Cited

U.S. PATENT DOCUMENTS

| 3,045,470 | A | * | 7/1962 | Crandell | ............ | G05D 16/2066 |
| | | | | | | 73/1.64 |
| 2003/0108435 | A1 | * | 6/2003 | Meyer | ............. | F04B 27/02 |
| | | | | | | 417/255 |
| 2003/0226392 | A1 | * | 12/2003 | Naumiec | ............. | G01L 27/005 |
| | | | | | | 73/1.71 |
| 2008/0300802 | A1 | * | 12/2008 | Lakhani | ............. | G01F 1/44 |
| | | | | | | 702/45 |
| 2016/0252912 | A1 | * | 9/2016 | Horwitz | ............. | G01F 1/88 |
| | | | | | | 137/2 |

FOREIGN PATENT DOCUMENTS

WO 2019/011353 A1 1/2019

OTHER PUBLICATIONS

Extended European Search Report, dated Apr. 14, 2022, for European Application No. 21211147.0-1001, 6 pages.

* cited by examiner

*Primary Examiner* — Patrick Assouad
*Assistant Examiner* — Mark A Shabman
(74) *Attorney, Agent, or Firm* — Seed IP Law Group LLP

(57) ABSTRACT

A pressure measurement device is configured to adjust a gas pressure in an external gas cavity that is fluidly coupled thereto and measure the adjusted gas pressure in the external gas cavity. The pressure measurement device includes a port, a pressure control module, a port pressure sensor, and a gas discharging port. The pressure measurement device is fluidly coupled to the external gas cavity through the port. The pressure control module is coupled to the port through a gas passage and configured to operably provide pressurized gas to the external gas cavity or draw gas from the external gas cavity. The port pressure sensor is coupled to the port and configured to measure a gas pressure at the port. The gas discharging port is coupled to the port and the pressure control module, and configured to operably discharge gas from the port or the pressure control module to an external environment.

18 Claims, 13 Drawing Sheets

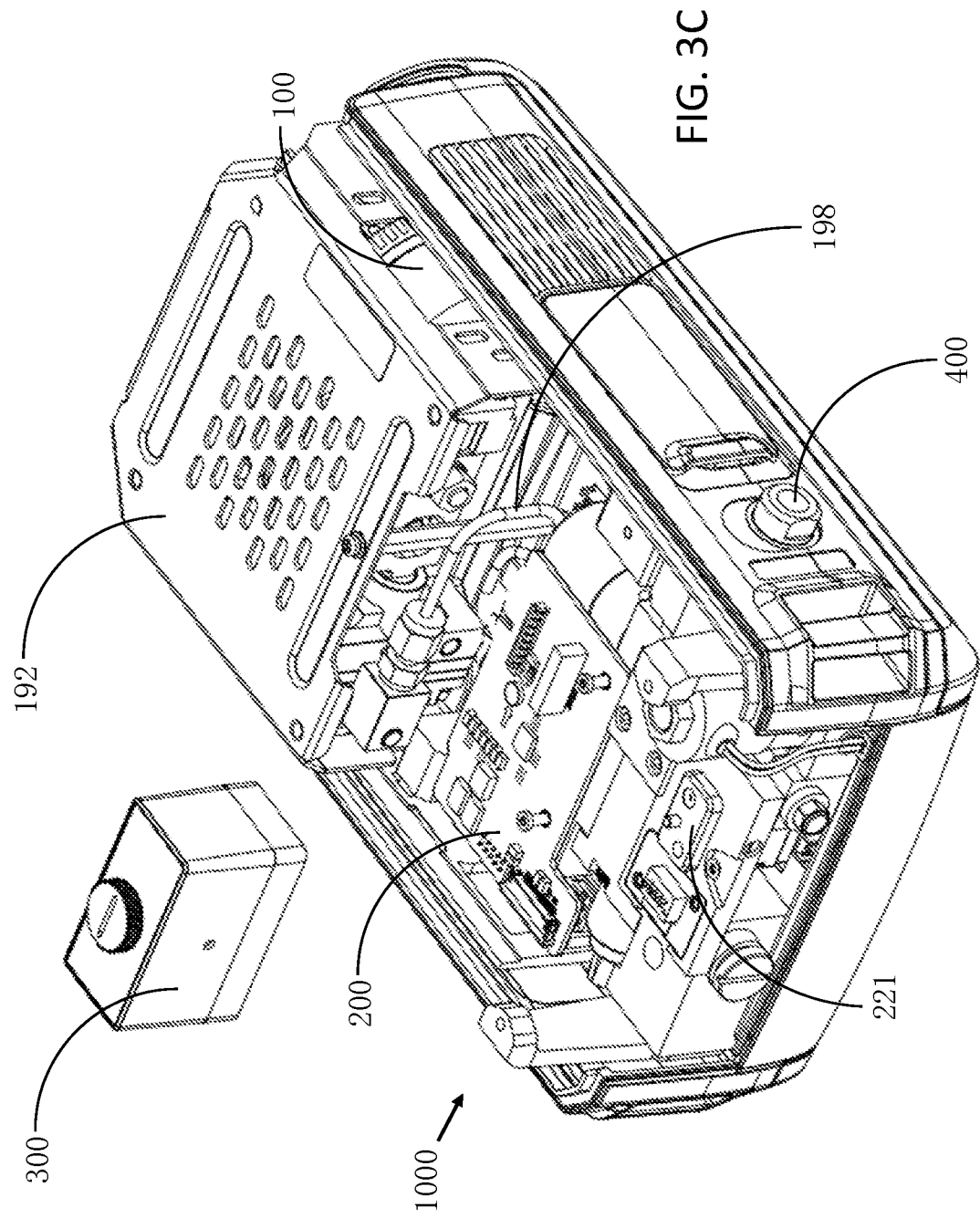

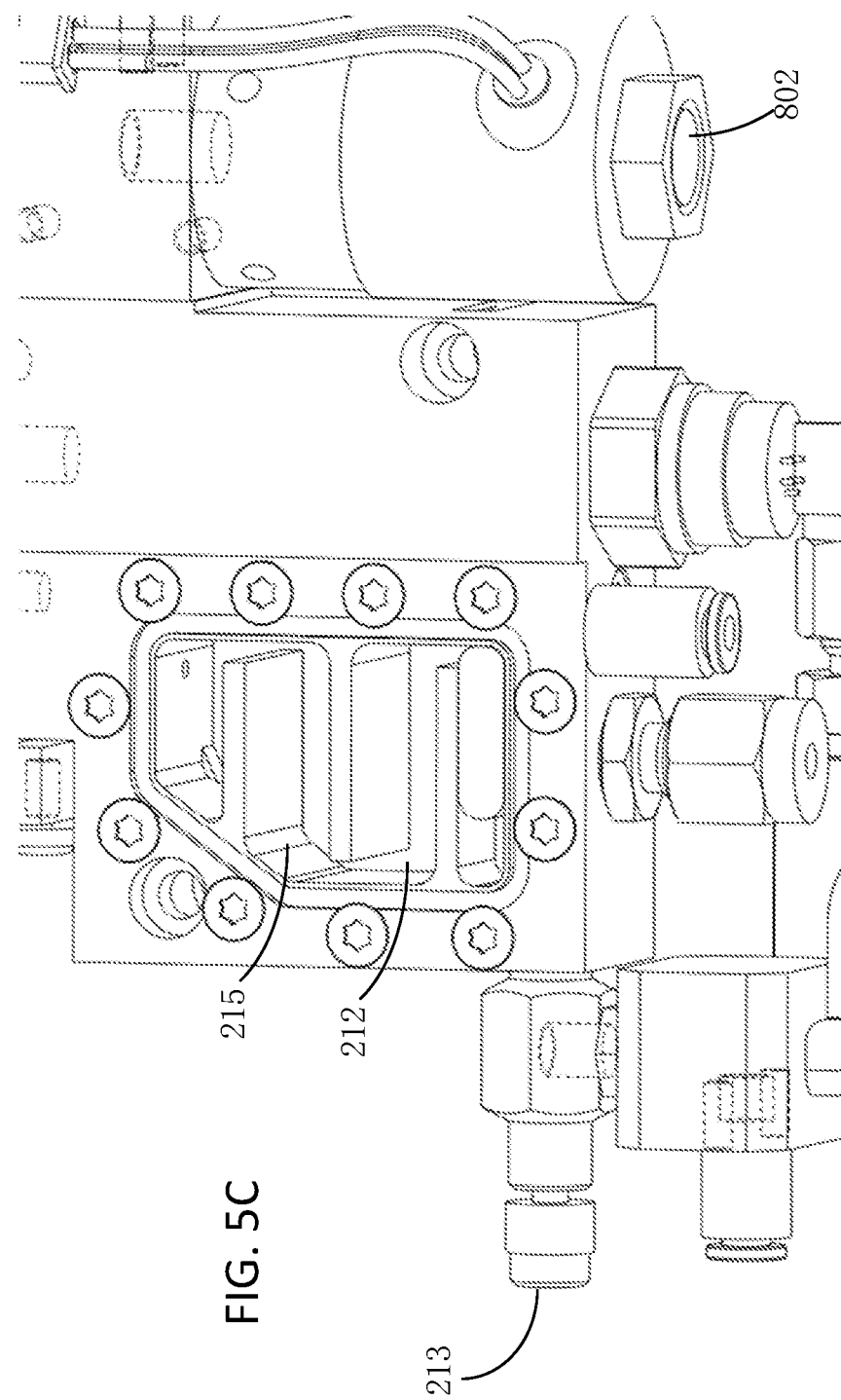

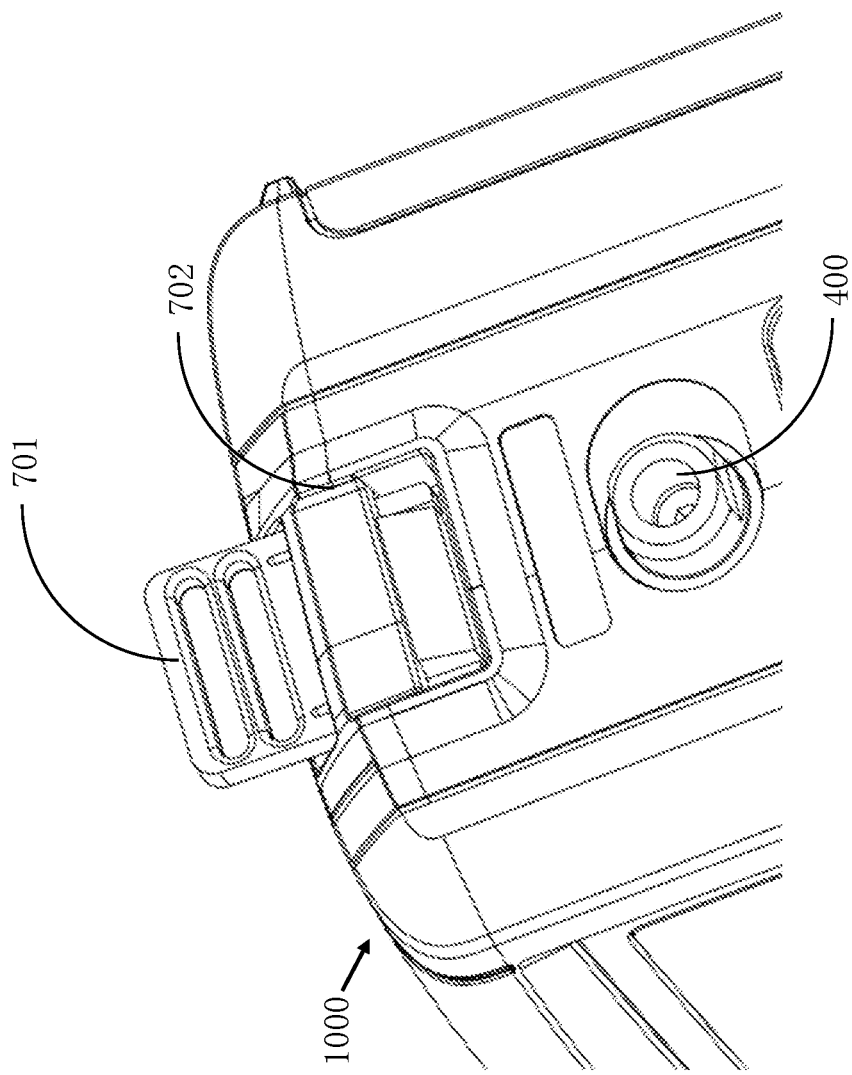

PRESSURE MEASUREMENT DEVICE

BACKGROUND

Technical Field

The present disclosure relates to the technical field of pressure measurement, and more specifically, to a pressure measurement device.

Description of the Related Art

In an industrial production process, after a pressure gauge has been used for a period of time, it is necessary to test the pressure gauge so as to determine whether the pressure gauge is accurate. Testing of the pressure gauge is generally performed in a laboratory or on site. However, testing of a high pressure measurement range of the pressure gauge generally is performed in the laboratory by using a conventional benchtop high pressure measurement device including an external gas cylinder and an alternating-current power supply. Such conventional benchtop high pressure measurement devices generally have a relatively large size, and, therefore, cannot easily be carried to a site for measurement.

Accordingly, it is desired to provide a portable pressure measurement device so as to perform on-site high pressure measurements and testing.

BRIEF SUMMARY

With respect to problems existing in conventional benchtop high pressure measurement devices as set forth above, the present disclosure provides a portable pressure measurement device.

According to at least one aspect, the present disclosure provides a pressure measurement device configured to adjust a gas pressure in an external gas cavity that is fluidly coupled thereto, and measure the adjusted gas pressure in the external gas cavity. The pressure measurement device comprises a port, the pressure measurement device being fluidly coupled to the external gas cavity through the port; a pressure control module, coupled to the port through a gas passage, and configured to operably provide pressurized gas to the external gas cavity or to draw gas from the external gas cavity so as to generate depressurized gas in the external gas cavity; a port pressure sensor, coupled to the port, and configured to measure a gas pressure at the port; and a gas discharging port, coupled to the port and the pressure control module, and configured to operably discharge gas from the port or the pressure control module into an external environment.

In some embodiments, the gas passage comprises a first proportional valve and a first isolation valve, coupled in series between the pressure control module and the port, wherein when the pressure control module provides pressurized gas to the external gas cavity or draws gas from the external gas cavity, the first proportional valve and the first isolation valve are opened to allow gas to flow between the external gas cavity and the pressure control module, so that the pressurized gas or the depressurized gas is formed in the external gas cavity.

In some embodiments, the gas passage further comprises a second proportional valve, coupled between the gas discharging port and the port, and configured to be opened in cooperation with the first proportional valve so as to enable the gas to be discharged from the port through the gas discharging port.

In some embodiments, the gas passage further comprises a second isolation valve, coupled between the gas discharging port and the pressure control module, and configured to be opened so as to discharge gas out of the pressure control module through the gas discharging port.

In some embodiments, the pressure control module comprises a gas pump.

In some embodiments, the gas pump is a multi-stage electric gas pump, and comprises a driving mechanism; an eccentric shaft, the eccentric shaft comprising a main body having a longitudinal axis, a first eccentric portion, and a second eccentric portion, wherein the first eccentric portion and the second eccentric portion are fixed on the main body; the eccentric shaft is driven by the driving mechanism to produce a first circular movement of the first eccentric portion around the longitudinal axis and a second circular movement of the second eccentric portion around the longitudinal axis, wherein the second circular movement is synchronized with the first circular movement; a first cylinder, the first cylinder comprising a first chamber and a first piston rod, and the first piston rod being connected to the first eccentric portion and being configured to reciprocate in response to the first circular movement of the first eccentric portion so as to periodically pressurize gas drawn into the first chamber from an external environment of the multi-stage electric gas pump and then discharge first pressurized gas out of the first chamber; a second cylinder, the second cylinder being in fluid communication with the first cylinder, the second cylinder comprising a second chamber and a second piston rod, and the second piston rod being connected to the first eccentric portion and being configured to reciprocate in response to the first circular movement of the first eccentric portion so as to periodically pressurize the first pressurized gas drawn into the second chamber from the first chamber of the first cylinder and then discharge second pressurized gas out of the second chamber; and a third cylinder, the third cylinder being in fluid communication with the second cylinder, the third cylinder comprising a third chamber and a third piston rod, and the third piston rod being connected to the second eccentric portion and being configured to reciprocate in response to the second circular movement of the second eccentric portion so as to periodically pressurize the second pressurized gas drawn into the third chamber from the second chamber of the second cylinder and then discharge third pressurized gas out of the third chamber.

In some embodiments, the pressure measurement device further comprises a support frame, an elastic gasket, and a flexible tube; the support frame accommodates the gas pump; the gas pump is connected to the support frame through the elastic gasket; the gas pump is in fluid communication with the pressure control module through the flexible tube.

In some embodiments, the pressure control module further comprises a gas-liquid separation device; the gas-liquid separation device comprises a cavity and a liquid discharging port, the cavity being formed by a plurality of curved flow passages communicating with each other; after the gas enters the gas-liquid separation device, part of the gas contacts a wall surface of the cavity and then condenses into a liquid; and the liquid is discharged from the liquid discharging port.

In some embodiments, the pressure control module further comprises a pressure measurement module connection port, and the pressure measurement module is detachably coupled to the pressure measurement module connection port.

In some embodiments, the pressure measurement device further comprises a portable assembly; the portable assembly comprises a strap, a buckle latch, and a buckle base; the buckle latch is located on an end portion of the strap; the buckle base is formed on a housing of the pressure measurement device; and the buckle latch is detachably connected to the buckle base.

The foregoing is a summary of the present disclosure where simplification, generalization, and omitted details may exist. Therefore, it should be appreciated by those skilled in the art that this section is for exemplary illustration only, and is not intended to limit the scope of the present disclosure.

BRIEF DESCRIPTION OF THE SEVERAL VIEWS OF THE DRAWINGS

The aforementioned features and other features of the present disclosure will be more fully and clearly understood through the specification below and the appended claims with reference to the accompanying drawings. It can be understood that these accompanying drawings illustrate only a few embodiments of the present disclosure, and therefore should not be considered as limiting the scope of the present disclosure. The content of the present disclosure will be described more explicitly and in more detail with the accompanying drawings.

FIG. 3C shows a perspective view of a pressure measurement device at another angle according to an embodiment of the present disclosure, wherein part of a housing and a power supply of the pressure measurement device are removed;

FIG. 5C shows a partial view of a pressure control module of a pressure measurement device according to an embodiment of the present disclosure;

FIG. 7 shows a perspective view of a portable assembly of a pressure measurement device according to an embodiment of the present disclosure.

DETAILED DESCRIPTION

Figure 1:
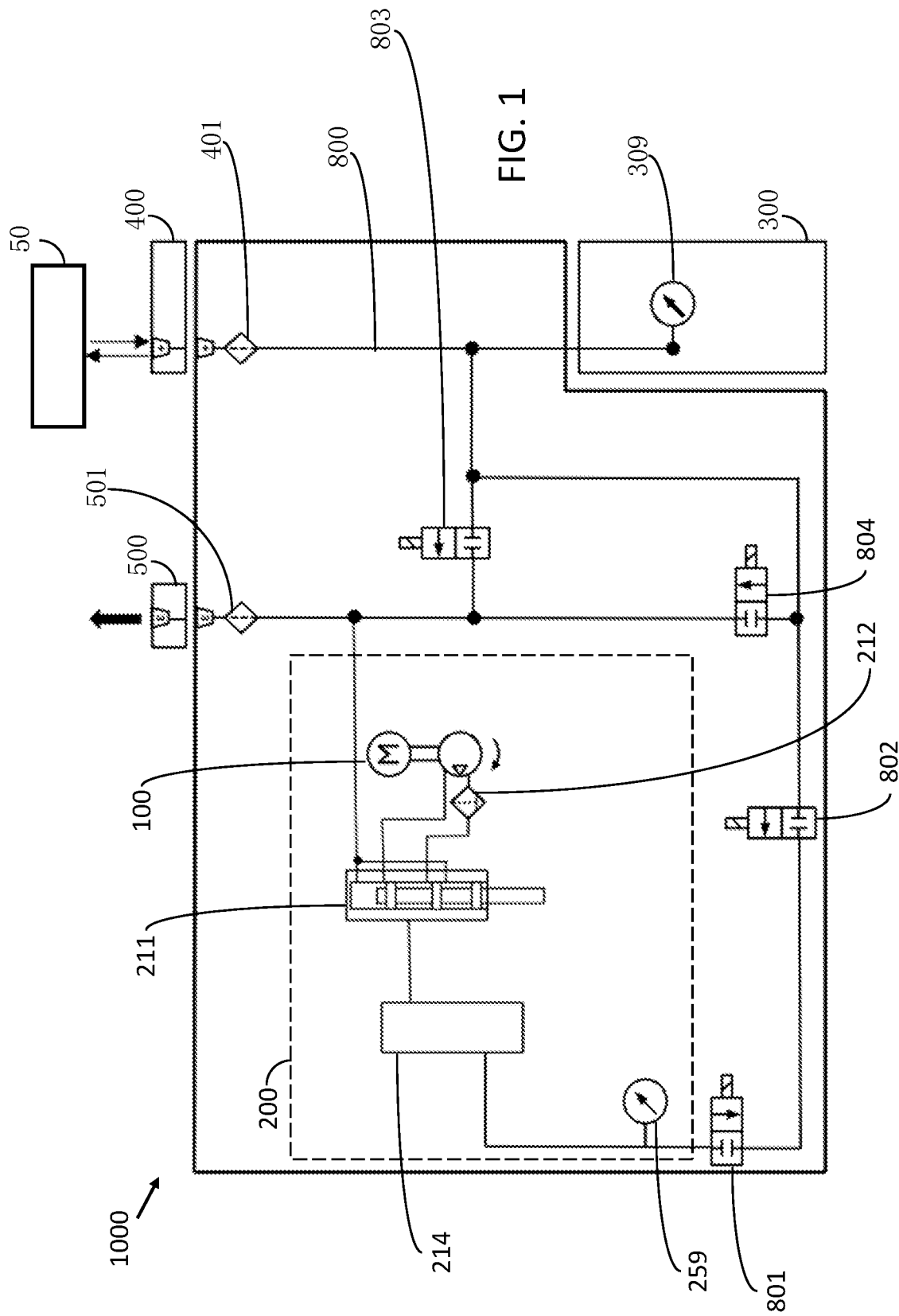
FIG. 1 shows a schematic diagram of a pressure measurement device according to an embodiment of the present disclosure.

The following detailed description is made with reference to the accompanying drawings constituting a part of the description. Unless otherwise specified in the context, similar reference numerals usually represent similar components in the accompanying drawings. The illustrative embodiments described in the detailed description, the accompanying drawings, and the claims are not intended to limit the scope of protection of the present disclosure. Without departing from the spirit or scope of the subject matter of the present disclosure, other embodiments can be adopted and other modifications can be made. It can be understood that the various aspects of the present disclosure generally described in the present disclosure and graphically presented in the accompanying drawings may be arranged, replaced, combined, and designed in many different configurations, and these configurations all explicitly constitute a part of the present disclosure.

FIG. 1 is a schematic diagram of a pressure measurement device according to an embodiment of the present disclosure, and schematically shows a diagram of operations of components such as a pressure control module 200, a port pressure sensor 309, a port 400, and a gas discharging port 500 included in the pressure measurement device 1000. According to specific applications, the pressure measurement device 1000 may be configured to be a pressure calibration device so as to calibrate an external pressure measurement instrument, which may be referred to as a device under test (DUT).

As shown in FIG. 1, the pressure measurement device 1000 is fluidly coupled to an external gas cavity 50 through the port 400. In some embodiments, the external gas cavity 50 is accommodated in a device under test (not shown), specifically, accommodated in a gas cavity of a pressure gauge, and the pressure gauge is equipped with a pressure sensor. In other words, the external gas cavity 50 is generally within a device under test (DUT) and the port 400 is in fluid communication with the external gas cavity 50 to be utilized to calibrate the DUT. In this case, a measurement result of the pressure sensor in the pressure gauge can be calibrated by measuring a pressure of the external gas cavity 50. In some embodiments, the pressure measurement device 1000 may include a filtration device 401 outside the port 400 to prevent gas in the external environment or in the external gas cavity 50 from entering the pressure measurement device 1000 through the port 400 and causing contamination to a gas passage. Preferably, the filtration device 401 is replaceable, so that the filtration device 401 can be replaced according to a particle size of suspended solids in a gas in the external environment or in the external gas cavity 50 or a service life thereof. Alternatively, the filtration device 401 may also be located between the port 400 and the pressure control module 200, as shown in FIG. 1.

The pressure control module 200 is coupled to the port 400 through a gas passage 800, and is then fluidly coupled to the external gas cavity 50. The pressure control module 200 is configured to operably provide pressurized gas to the external gas cavity 50 or draw gas from the external gas cavity 50 so as to generate depressurized gas in the external gas cavity 50. The depressurized gas for providing the pressurized gas may have different pressure values, so that different pressure values can be calibrated during calibration performed on the pressure gauge where the external gas cavity 50 is located. The pressure control module 200 may include one device for providing pressurized gas to the external gas cavity 50 and another device drawing gas from the external gas cavity 50 so as to generate depressurized gas in the external gas cavity 50, respectively, or only provide one single device for both providing pressurized gas to the external gas cavity 50 and drawing gas from the external gas cavity 50 so as to generate depressurized gas in the external gas cavity 50. Preferably, the device includes a gas pump 100 and a reversing valve 211, so that pressurized gas can be provided to the external gas cavity 50 or gas can be drawn from the external gas cavity 50 so as to generate depressurized gas in the external gas cavity 50 through switching of the reversing valve 211 in cooperation with the gas pump 100. More preferably, the gas pump 100 may be a multi-stage electric gas pump. By using the multi-stage electric gas pump, the volume of the gas pump can be reduced, thus providing a portable pressure measurement device 1000 that is easily transportable to and from different sites and locations to perform on-site measurements or testing of a device under test (DUT). For example, the DUT may be a pressure measurement device or a pressure measurement instrument hat is to be serviced or is nearing the end of its usable lifespan. For example, the pressure measurement device 1000 may be a handheld portable pressure measurement device including components that may be quickly and easily replaced onsite by a user of the pressure measurement device 1000.

The pressure control module 200 may further include a buffer cavity 214, and the buffer cavity 214 can accommodate pressurized gas or gas drawn from the external gas cavity 50 so as to perform buffering. The pressure control module 200 may further include a buffer cavity pressure sensor 259 that is coupled to the buffer cavity 214 or is arranged in the buffer cavity 214. The buffer cavity pressure sensor 259 is configured to measure a pressure of the gas accommodated in the buffer cavity 214. A gas pressure measurement result generated by the buffer cavity pressure sensor 259 may be provided to a controller of the pressure control module 200 or a controller of the pressure measurement device 100, so that comparison with a predetermined desired pressure can be performed so as to adjust the operation of the gas pump 100 according to the comparison result. For example, when the gas pump is configured to provide pressurized gas, if the gas pressure measurement result is lower than the desired pressure, the gas pump may be controlled to increase power so as to generate pressurized gas having a higher pressure. Alternatively, if the gas pressure measurement result is lower than the desired pressure, the gas pump may also be controlled to reduce the power so as to generate pressurized gas having a relatively low pressure. When the gas pump is configured to provide depressurized gas, the operation of the gas pump can be controlled in a similar manner, which will not be repeatedly described herein.

The pressure control module 200 may further include a gas-liquid separation device 212. The gas-liquid separation device 212 includes a liquid discharging port (see the liquid discharging port 213 in FIG. 5A) and a cavity 215 formed by a plurality of curved flow passages communicating with each other (not shown in FIG. 1; see FIGS. 5B and 5C). During pressure measurement, after the gas enters the gas-liquid separation device 212, part of the gas (mainly water vapor or other gas having a relatively low condensation point) contacts a wall surface of the cavity 215 and then condenses into a liquid, and the liquid is discharged from the liquid discharging port 213. The gas-liquid separation device 212 may include a filtration device to avoid contamination to a flow passage in the gas-liquid separation device 212 caused when the pressurized gas enters therein.

The pressure measurement module 300 includes a port pressure sensor 309. The port pressure sensor 309 is coupled to the port 400, and is configured to measure a gas pressure at the port 400. The port 400 is fluidly coupled to the external gas cavity 50, so that the measured pressure at the port 400 is a pressure of the external gas cavity 50. In some embodiments, the port pressure sensor 309 may be designed to be removably coupled to the port 400, so that a port pressure sensor 309 having a different measurement range can be used through replacement so as to adapt to the pressure measurement of a different external gas cavity 50. In other words, various types of port pressure sensors 309 with different measurement ranges may be swapped, changed, or replaced to adapt to the external gas cavity 50 to which the pressure measurement device 1000 is fluidly coupled.

The gas discharging port 500 is coupled (e.g., fluidly coupled) to the port 400 and the pressure control module 200, and is configured to operably discharge gas from the port 400 or the pressure control module 200 to an external environment. For example, in some embodiments, the external environment is outside the external gas cavity 50 and outside the pressure measurement device 1000, and the pressure at the port 400 may be expelled through the pressure measurement device 1000 by being discharged through the gas discharging port 500. The gas discharging port 500 may further include a filtration device 501 to avoid contamination to the gas passage caused when gas in the environment enters the pressure measurement device 1000. Preferably, the filtration device 501 is replaceable, and can be replaced according to a particle size of suspended solids in a gas in the environment or a service life thereof. Alternatively, the filtration device 501 may also be located between the gas discharging port 500 and the pressure control module 200. Preferably, the filtration device 401 accommodated in or adjacent to the port 400 is the same as the filtration device 501 accommodated in or adjacent to the gas discharging port 500, so that an operator or user can easily replace one of or both of the respective filtration devices 401, 501 such that a likelihood of mis-operation by the operator can be reduced or avoided altogether.

In some embodiments, the gas passage 800 includes a first proportional valve 801, a first isolation valve 802, a second proportional valve 803, and a second isolation valve 804 coupled therein. By allowing or restricting flowing of the gas, these respective valves can change the flow of gas in the gas passage 800. Preferably, one or more of the first proportional valve 801, the first isolation valve 802, the second proportional valve 803, and the second isolation valve 804 are solenoid valves. The first proportional valve 801 and the first isolation valve 802 are coupled in series between the pressure control module 200 and the port 400. When the pressure control module 200 provides pressurized gas to the external gas cavity 50 or draws gas from the external gas cavity 50, the first proportional valve 801 and the first isolation valve 802 are opened to allow gas to flow between the external gas cavity 50 and the pressure control module 200, and the pressurized gas or the depressurized gas is formed in the external gas cavity 50. The first isolation valve 802 can protect the first proportional valve 801. The gas from the external gas cavity 50 sequentially flows through the first isolation valve 802 and then flows through the first proportional valve 801. Therefore, when the first proportional valve 801 is closed, the first isolation valve 802 is also maintained closed so as to avoid damage caused to the first proportional valve 801 when the pressure of the external gas cavity 50 is excessively high. The pressure of the external gas cavity 50 may be considered excessively high when the pressure is greater than a pressure threshold that may be pre-determined or selected by an operator through a user input of the pressure measurement device 1000, determined by features (e.g., the respective valves) of the pressure measurement device 1000, or determined by a pressure sensor of the pressure measurement device 1000.

The second proportional valve 803 is coupled between the gas discharging port 500 and the port 400, and is configured to be opened in cooperation with the first proportional valve 801 so as to enable the gas to be discharged from the port 400 through the gas discharging port 500. When the first proportional valve 801 and the first isolation valve 802 are opened, the second proportional valve 803 is basically maintained closed. When the pressure of the pressurized gas provided to the external gas cavity 50 is excessively high (e.g., higher than a pressure threshold), the second proportional valve 803 is opened so as to release part of the pressure. For example, the pressure of the gas may be discharged through the gas discharging port 500 when the second proportional valve 803 is opened.

The second isolation valve 804 is coupled between the gas discharging port 500 and the pressure control module 200, and is configured to be opened so as to discharge gas out of the pressure control module 200 through the gas discharging port 500. When the pressure of the gas passage needs to be released completely, the first proportional valve 801, the first isolation valve 802, the second proportional valve 803, and the second isolation valve 804 are opened, so that the gas is discharged from the gas discharging port 500 and therefore the pressure of the gas passage 800 is restored to an ambient pressure. In addition, after gas drawing is completed and the gas pump 100 is closed, the first proportional valve 801 and the first isolation valve 802 are maintained opened, and gas can enter the gas passage 800 from the environment or the external gas cavity 50 through the port 400, so that the pressure of the gas passage 800 is restored to the ambient pressure.

It can be understood that the above configurations and selections regarding the gas passage and respective isolation valves and proportional valves therein are merely illustrative, and those skilled in the art could make adjustments and modifications according to actual conditions in which the pressure measurement device 1000 is to be utilized.

Figure 2:
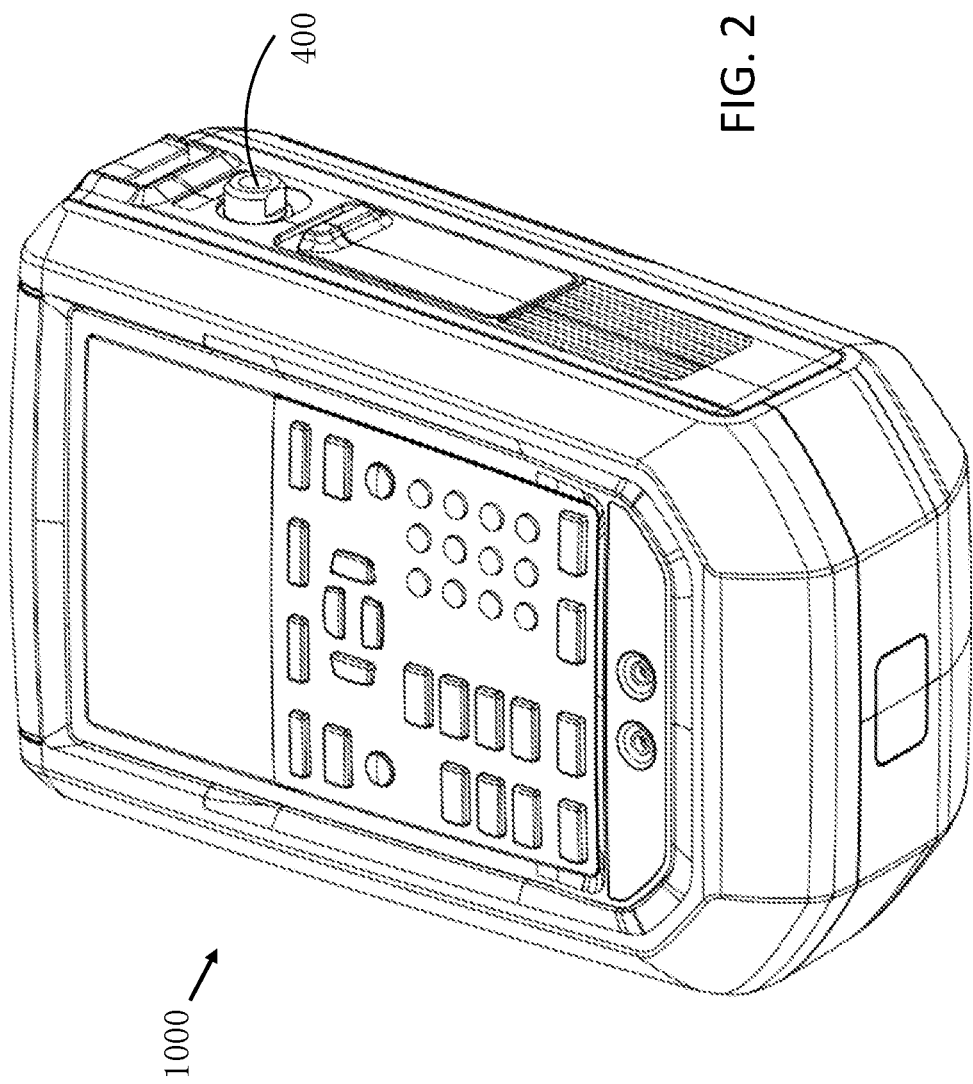
FIG. 2 shows a perspective view of a pressure measurement device at an angle according to an embodiment of the present disclosure.

FIG. 2 shows a perspective view of a pressure measurement device at an angle according to an embodiment of the present disclosure. The pressure measurement device 1000 is fluidly coupled to an external gas cavity 50 through a port 400. The pressure measurement device 1000 may be provided with an instrument keyboard and a display screen to provide an input/output interface so that an operator can control the pressure measurement device 1000.

Figure 3A:
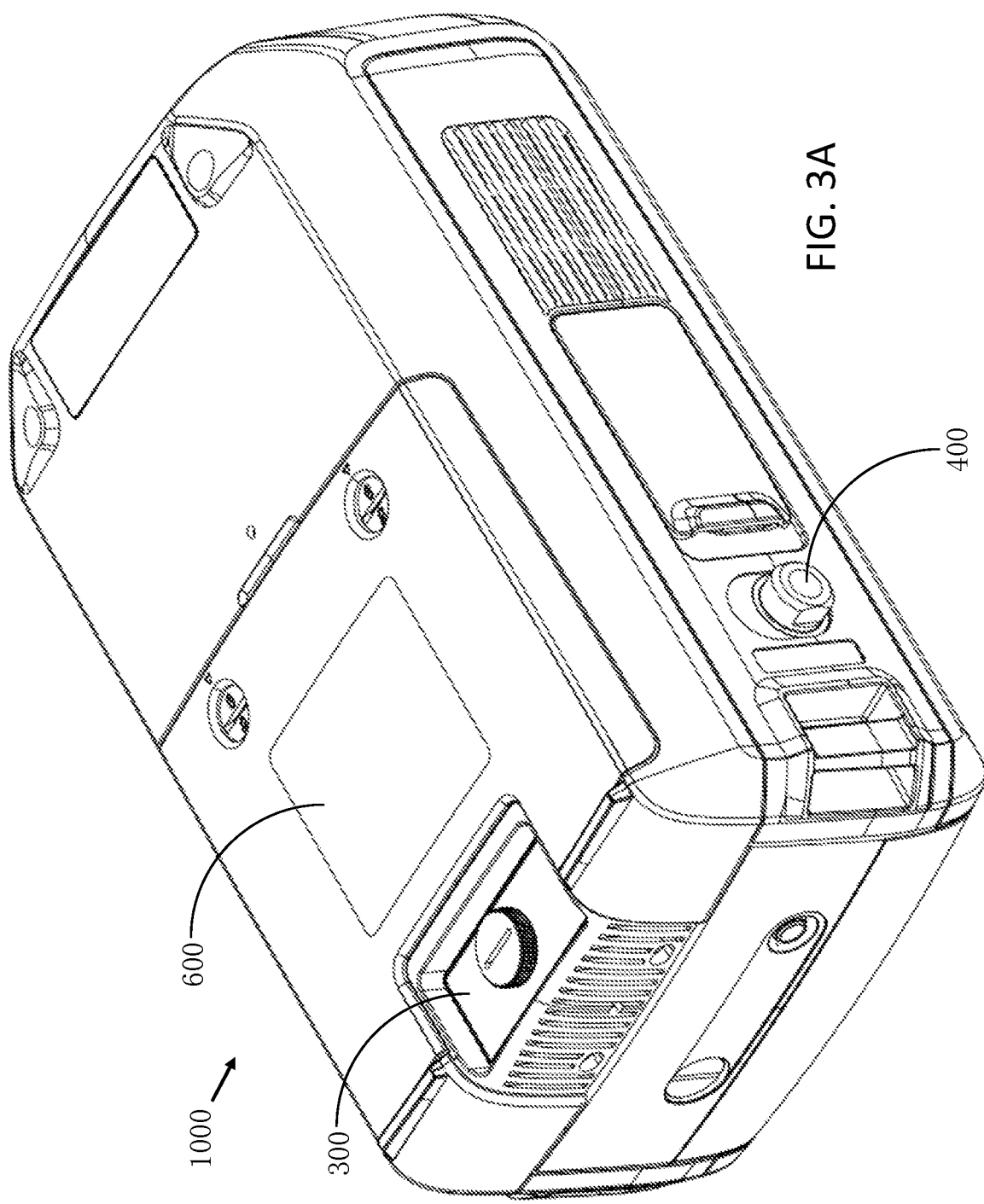
FIG. 3A shows a perspective view of a pressure measurement device at another angle according to an embodiment of the present disclosure, wherein a pressure measurement module is mounted on the pressure measurement device.
Figure 3B:
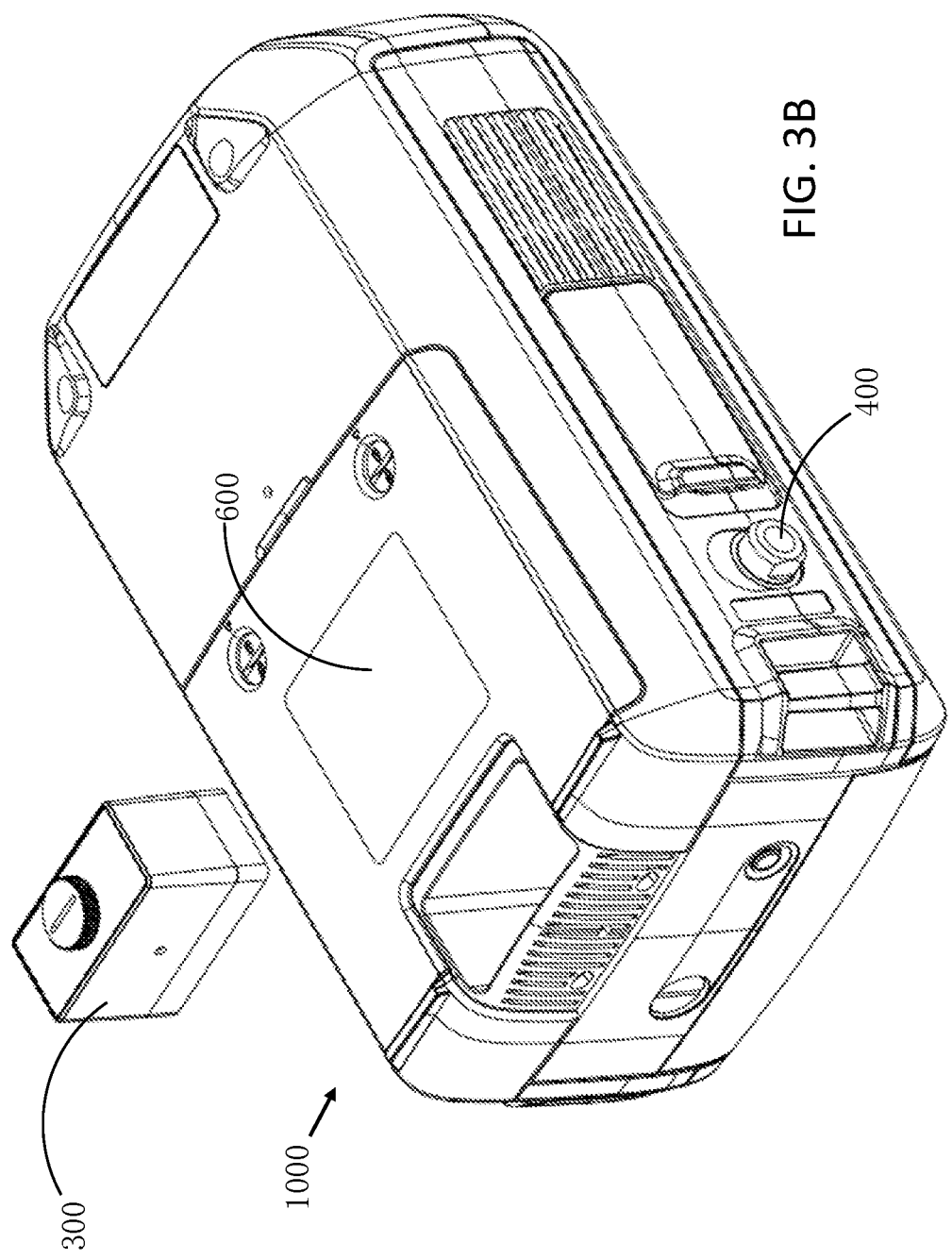
FIG. 3B shows a perspective view of a pressure measurement device at another angle according to an embodiment of the present disclosure, wherein a pressure measurement module is removed from the pressure measurement device.

FIG. 3A, FIG. 3B, and FIG. 3C show perspective views of a pressure measurement device 1000 at other angles respectively according to an embodiment of the present disclosure. The pressure measurement module 300 is mounted on the pressure measurement device 1000 in FIG. 3A, while the pressure measurement module 300 is removed from the pressure measurement device 1000 in FIG. 3B. Therefore, the pressure measurement module 300 is detachable and replaceable. The detachable and replaceable nature of various and different types of pressure measurement modules 300 allows for the pressure measurement device 1000 to be readily adapted and applicable to a relatively wide measurement range (for example, 30 psi to 1000 psi), and allows for different measurement ranges to be measured with the pressure measurement device 1000. For example, when a low pressure measurement is to be performed, a pressure measurement module 300 having a relatively small measurement range is used so as to improve the accuracy of measurement. Alternatively, when high pressure measurement is to be performed, a pressure measurement module 300 having a relatively wide measurement range is used so as to avoid damage caused to the pressure measurement module 300 due to excess beyond the measurement range.

A power supply 600 is within the pressure measurement device 1000 and powers the pressure measurement device 1000. The power supply 600 is a battery, and in some embodiments the battery may be integrally formed together with a housing. In some embodiments, the battery may be separated from the housing. In other embodiments, the battery is not detachable or replaceable. In some alternative embodiments, the power supply may not include any battery and may be connected to an adapter so as to supply power. Part of the housing and the power supply 600 are removed in FIG. 3C so as to better show an internal structure of the pressure measurement device 1000. A gas pump 100 is accommodated in a support frame 192, and the gas pump 100 is connected to a pressure control module 200 through a flexible tube 198. A pressure measurement module 300 is detachably connected to the pressure control module 200 through a pressure measurement module connection port 221.

Figure 4A:
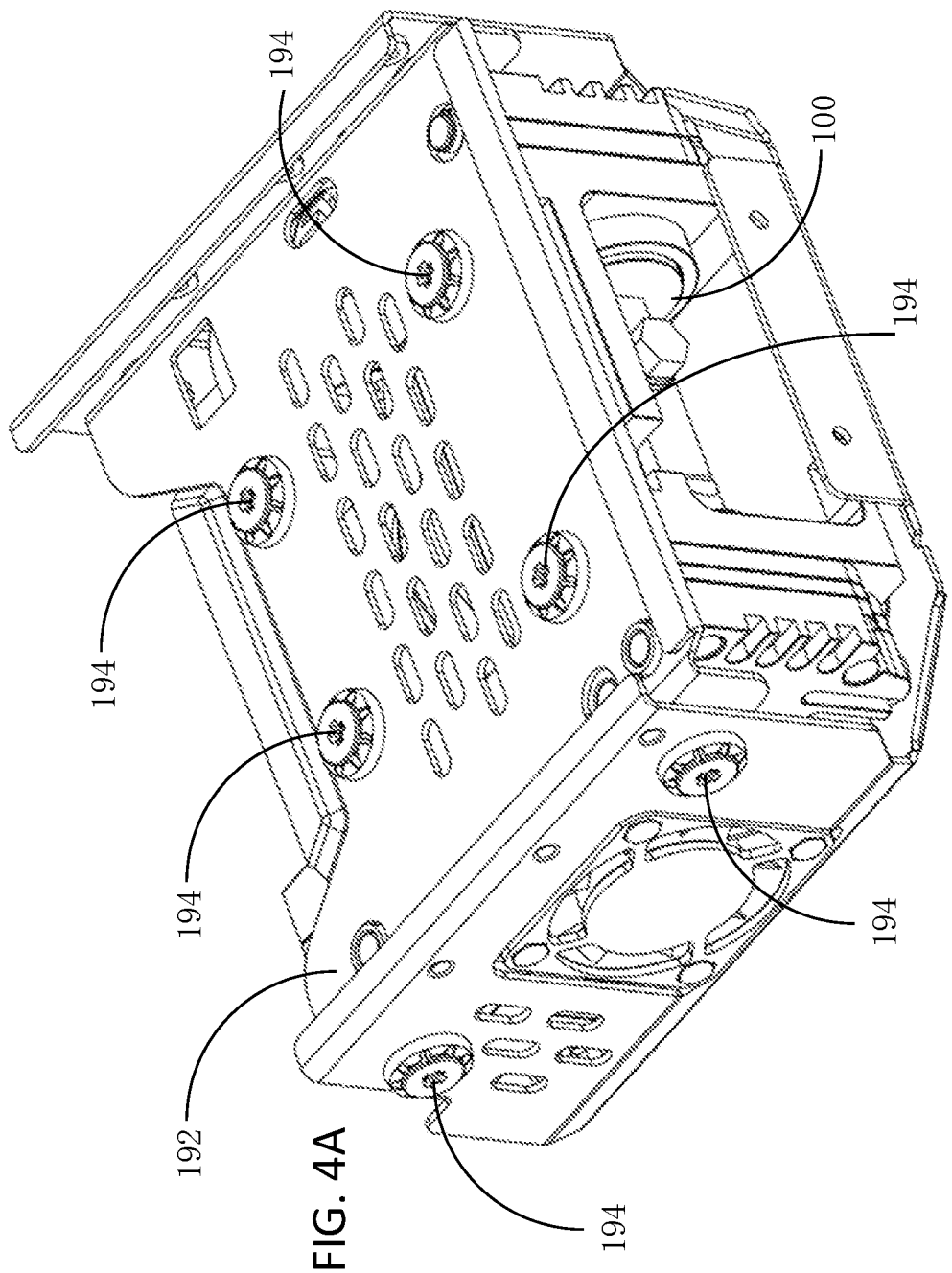
FIG. 4A shows a perspective view of a gas pump of a pressure measurement device accommodated in a support frame according to an embodiment of the present disclosure.
Figure 4B:
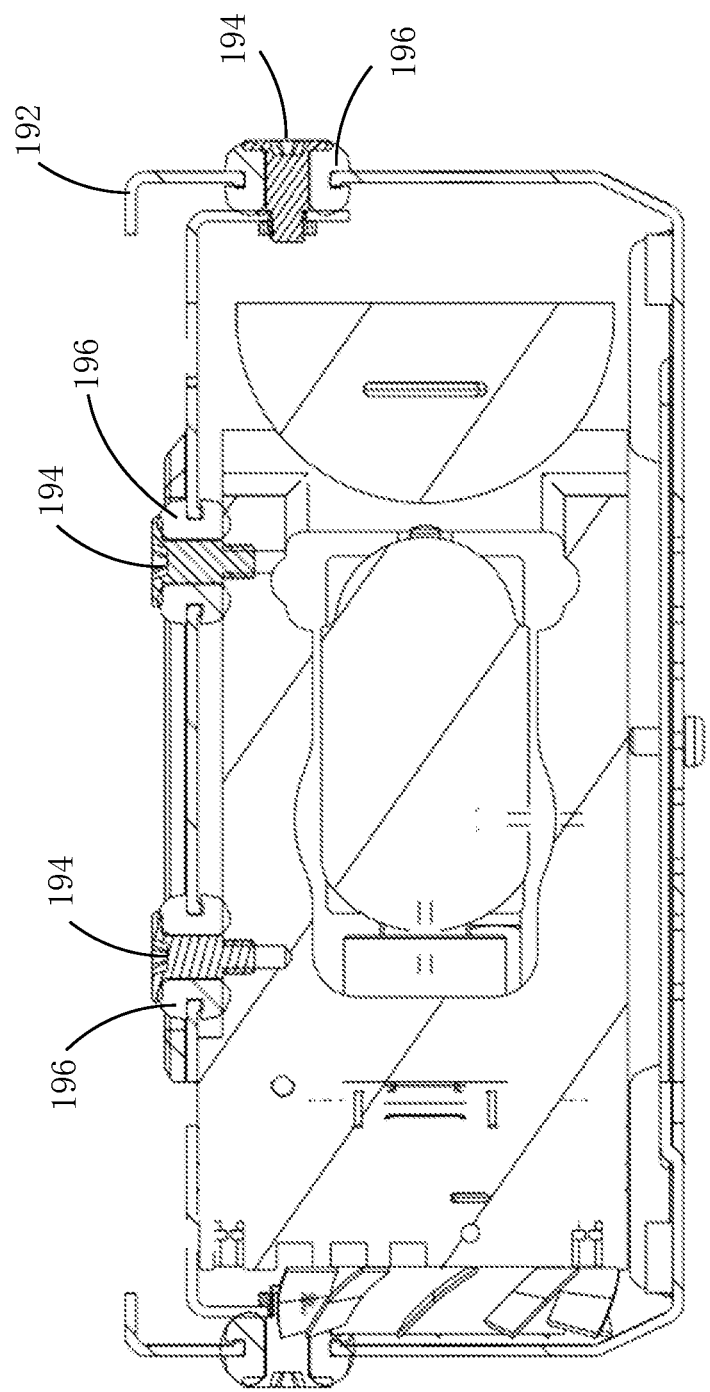
FIG. 4B shows a cross-sectional view of a gas pump of a pressure measurement device accommodated in a support frame according to an embodiment of the present disclosure.

FIG. 4A shows a perspective view of a gas pump of a pressure measurement device accommodated in a support frame according to an embodiment of the present disclosure. FIG. 4B shows a cross-sectional view of the gas pump of the pressure measurement device accommodated in the support frame according to an embodiment of the present disclosure. The gas pump 100 is connected to the support frame 192 through an elastic gasket 196 and a connecting piece 194. The connecting piece 194 is partially surrounded by the elastic gasket 196, so that vibration generated during operation of the gas pump 100 is at least partially absorbed by the elastic gasket 196. In some embodiments, the connecting piece 194 is a screw or a bolt. In some embodiments, the elastic gasket 196 is made of an elastic material, such as rubber and plastic.

Figure 5A:
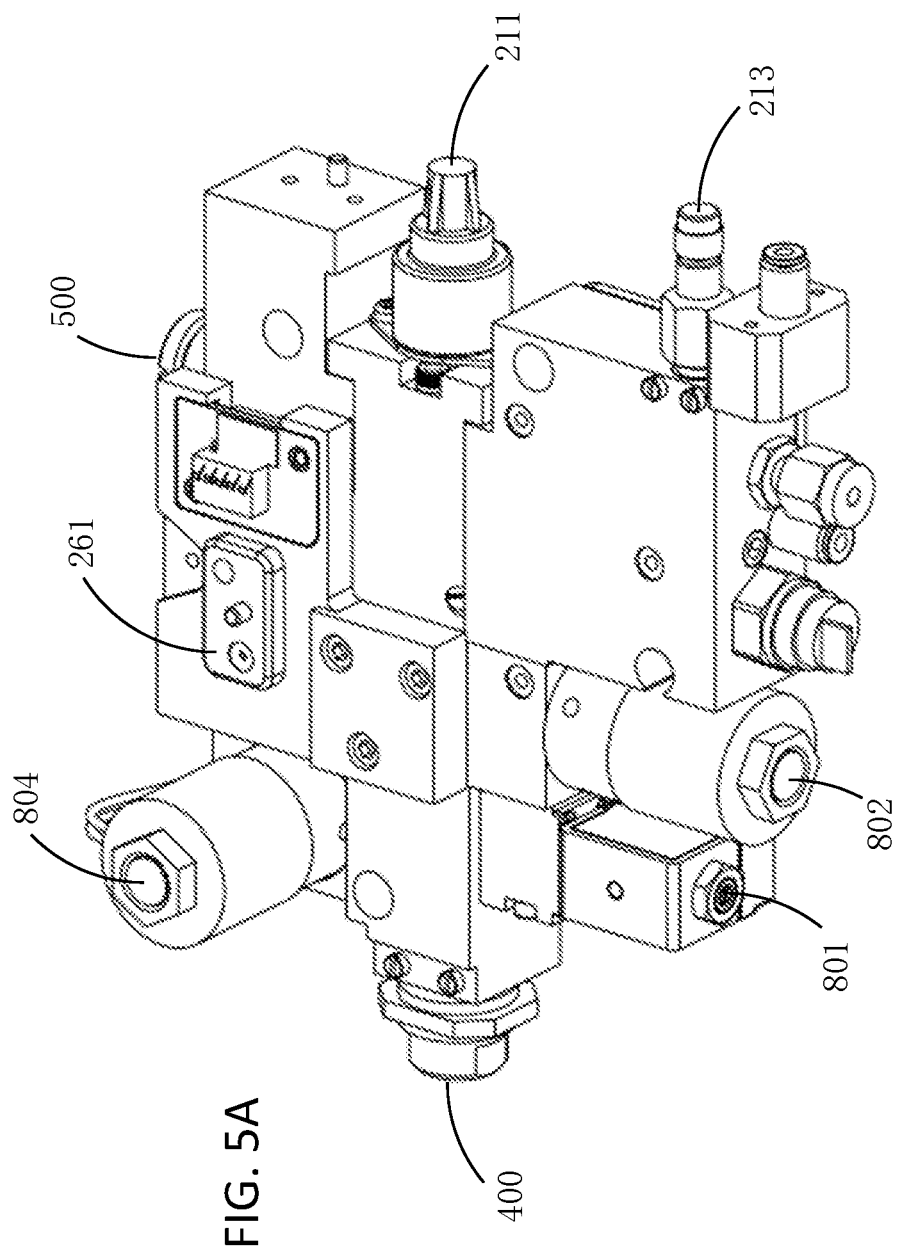
FIG. 5A shows a perspective view of a pressure control module of a pressure measurement device according to an embodiment of the present disclosure.
Figure 5B:
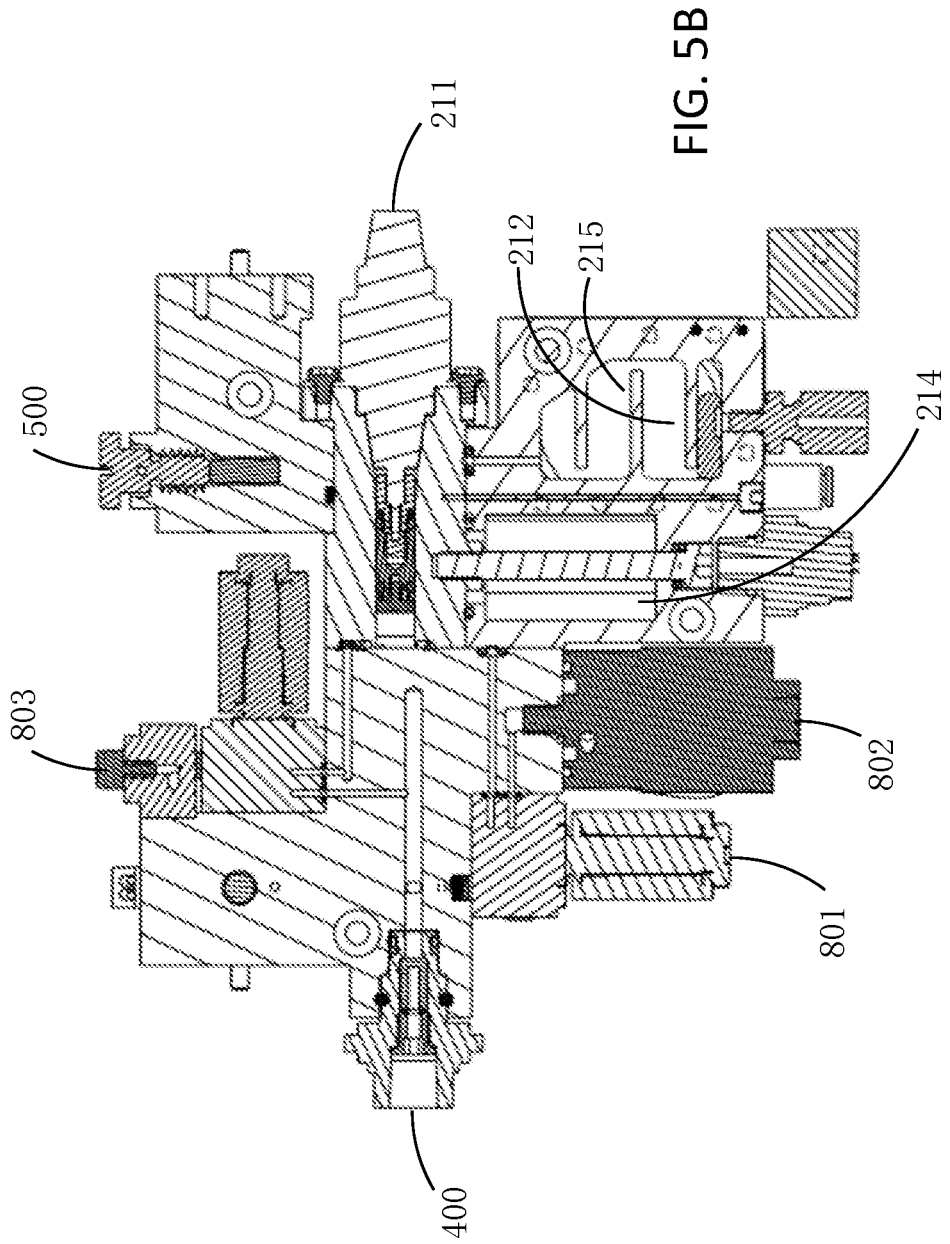
FIG. 5B shows a cross-sectional view of a pressure control module of a pressure measurement device according to an embodiment of the present disclosure.

FIG. 5A shows a perspective view of a pressure control module of a pressure measurement device according to an embodiment of the present disclosure. FIG. 5B shows a cross-sectional view of the pressure control module of the pressure measurement device according to an embodiment of the present disclosure. FIG. 5C shows a partial view of the pressure control module of the pressure measurement device according to an embodiment of the present disclosure. The partial view in FIG. 5C is enlarged and shows the gas-liquid separation device 212 so as to better show an internal structure of the gas-liquid separation device 212. The gas-liquid separation device 212 includes a liquid discharging port 213 and a cavity 215 formed by a plurality of curved flow passages communicating with each other. After gas enters the gas-liquid separation device 212, part of the gas contacts a wall surface of the cavity and then condenses into a liquid, and the liquid is discharged from the liquid discharging port 213. The volume of a buffer cavity for gas buffering can be adjusted according to actual applications, for example, the volume can be 30 milliliters, 25 milliliters, 20 milliliters, 15 milliliter, 10 milliliters, or some other volume.

Figure 6A:
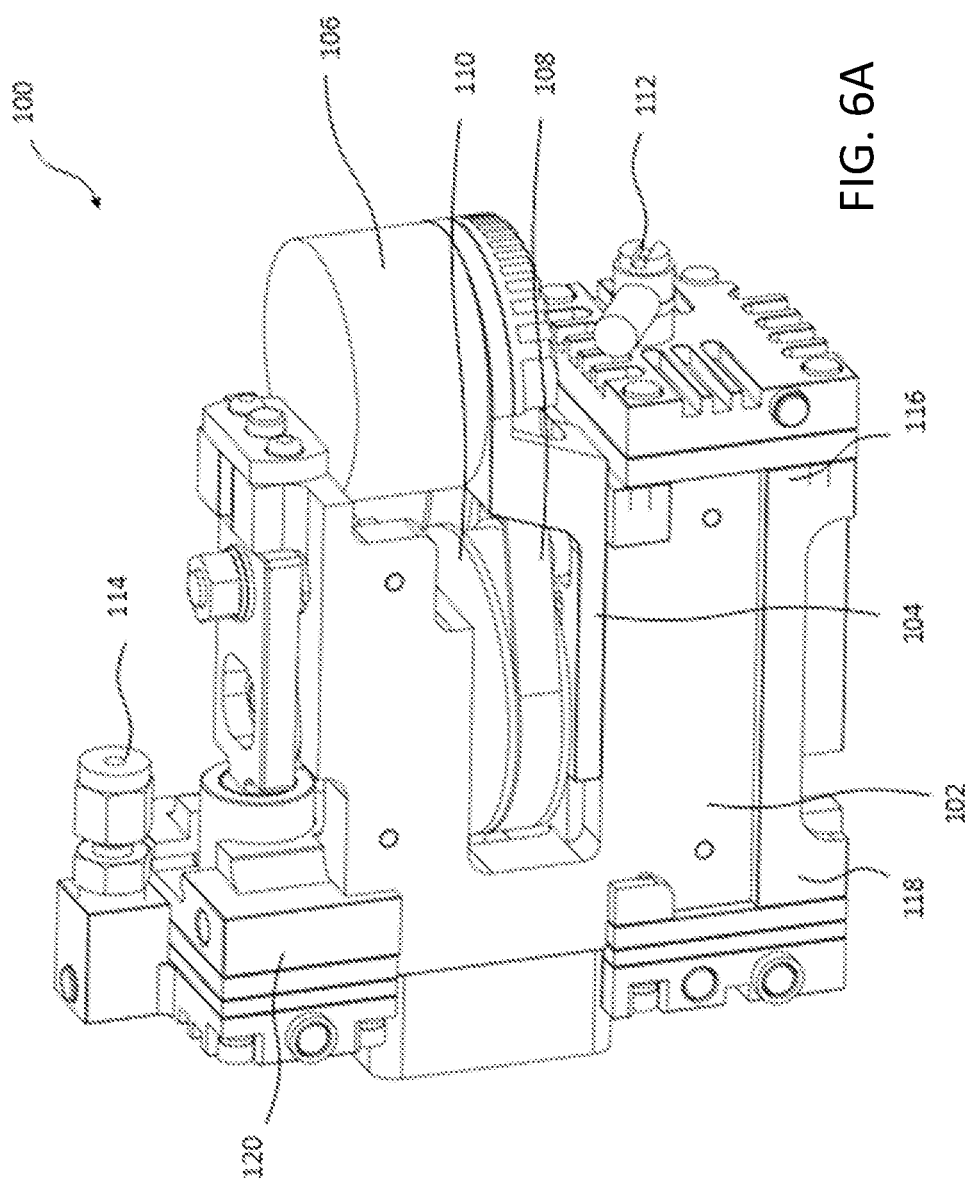
FIG. 6A shows a perspective view of a gas pump of a pressure measurement device according to an embodiment of the present disclosure.

FIG. 6A shows a perspective view of a multi-stage electric gas pump 100 according to an embodiment of the present disclosure. As shown in FIG. 6A, the gas pump 100 includes a frame 102 and a mounting plate 104 mounted on the frame 102. A motor 106 is mounted on the mounting plate 104 to provide driving force when operating. When the motor 106 is operating, a driving wheel 107 (shown in FIG. 6B) connected thereto drives an endless belt 108, and the endless belt 108 drives a driven wheel 110 to rotate. The endless belt 108 may be referred to as a belt, a drive belt, or some other like or similar type of belt for driving the driven wheel 110. Other details of the driving mechanism will be described in detail below in conjunction with other accompanying drawings. In an embodiment, the motor 106 may be a brushless direct-current motor or another common motor or driving mechanism.

Still referring to FIG. 6A, the gas pump 100 includes a gas inlet 112 and a gas outlet 114. When the motor 106 is operating, gas in an environment outside the gas pump 100 can enter the gas pump 100 through the gas inlet 112, be pressurized by the gas pump 100, and then be discharged out of the gas pump 100 through the gas outlet 114. More specifically, the gas pump 100 includes a first cylinder 116, a second cylinder 118, and a third cylinder 120. The first cylinder 116 is operably in communication with the environment through the gas inlet 112, and is in fluid communication with the second cylinder 118 located downstream thereof. The second cylinder 118 is further in fluid communication with the third cylinder 120 located downstream thereof. The third cylinder 120 is operably in communication with the environment through the gas outlet 114, and the gas outlet 114 is downstream from the third cylinder 120.

Figure 6B:
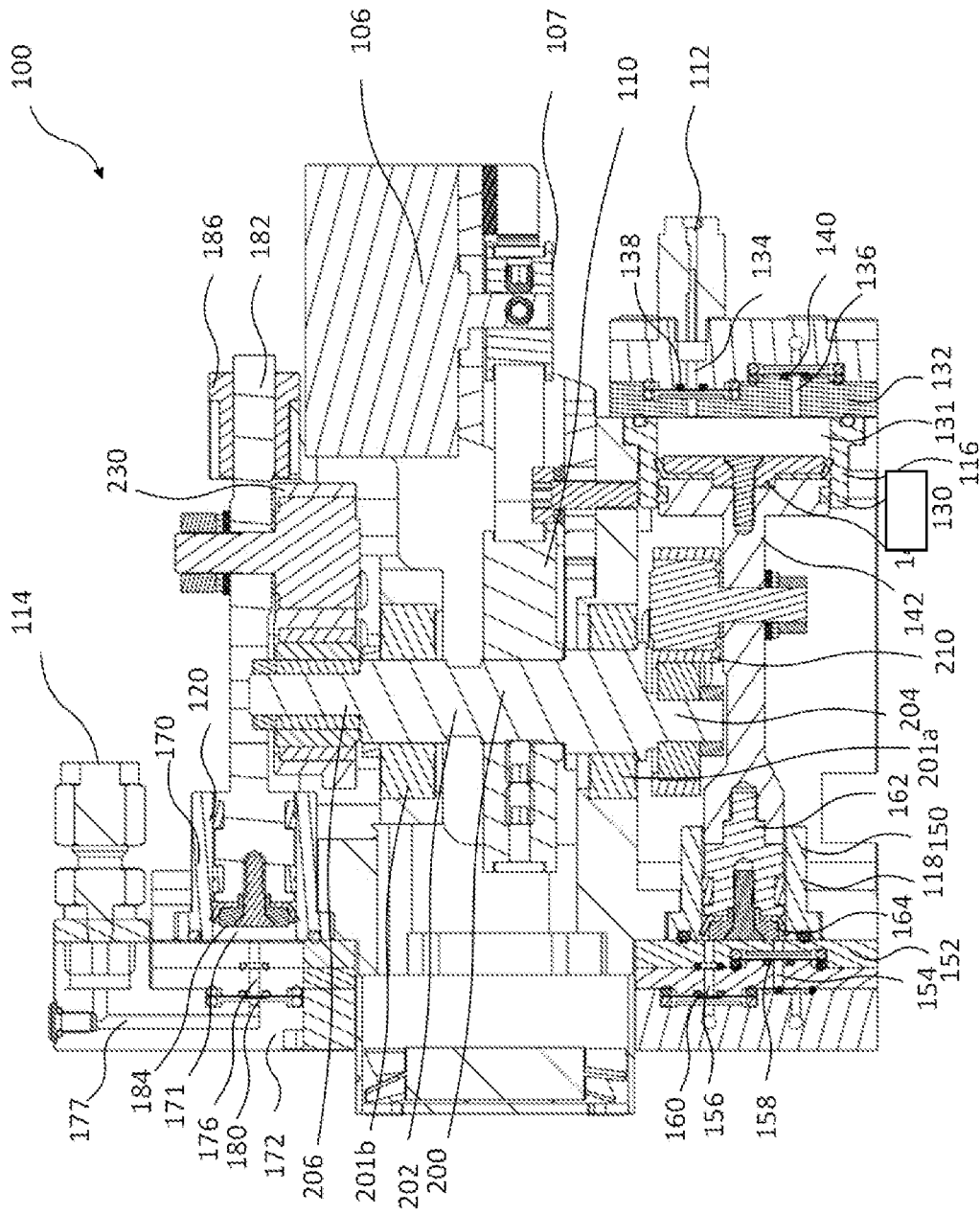
FIG. 6B shows a cross-sectional view of a gas pump of a pressure measurement device according to an embodiment of the present disclosure.

FIG. 6B shows a cross-sectional view of the multi-stage electric gas pump 100 as shown in FIG. 6A, and further shows an internal structure of the gas pump 100. As shown in FIG. 6B, the first cylinder 116 includes a first piston bush 130 defining a first chamber 131 and a first cylinder cover 132 sealingly connected to the first piston bush 130. The first chamber 131 may be partially delimited by the first piston bush 130 and may be partially delimited by the first cylinder cover 132. The first cylinder cover 132 includes a first inlet 134 and a first outlet 136. The first inlet 134 is in fluid communication with the gas inlet 112, and the first outlet 136 is in fluid communication with the second cylinder 118. In an embodiment, the first inlet 134 is provided with a check valve 138, and the check valve 138 allows gas to enter the first chamber 131 only from the environment outside the gas pump 100. In addition, the first outlet 136 is provided with a check valve 140, and the check valve 140 allows gas to be discharged downstream only from the first chamber 131. In an embodiment, the first cylinder 116 further includes a first piston rod 142. The first piston rod 142 includes a first piston cup 144 matching the first piston bush 130. The first piston cup 144 may be made of a rubber material, and, therefore, may be referred to herein as a first piston rubber cup. The first piston rubber cup 144 is configured to seal the first piston bush 130 together with the first cylinder cover 132. The first piston rod 142 can drive the first piston rubber cup 144 to reciprocate in the first chamber 131 to periodically change the volume of the first chamber 131 so as to continuously draw gas from the environment through the first inlet 134 (during at least part of a time period when the first piston rod 142 moves in a left direction as shown in FIG. 6B, the check valve 138 at the first inlet 134 is opened, and the check valve 140 at the first outlet 136 is closed) and discharge the pressurized gas through the first outlet 136 (during at least part of a time period when the first piston rod 142 moves in a right direction as shown in FIG. 6B, the check valve 138 at the first inlet 134 is closed, and the check valve 140 at the first outlet 136 is opened). In other words, the first piston rod 142 may move in a leftward and rightward direction, respectively, based on the orientation as shown in FIG. 6B, resulting in the first piston rubber cup 144 moving toward and away from the first cylinder cover 132, respectively.

Still referring to FIG. 6B, similar to the first cylinder 116, the second cylinder 118 includes a second piston bush 150 defining a second chamber 151 and a second cylinder cover 152 sealingly connected to the second piston bush 150. The second chamber 151 may be partially delimited by the second piston bush 150 and may be partially delimited by the second cylinder cover 152. The second cylinder cover 152 includes a second inlet 154 and a second outlet 156. The second inlet 154 is in fluid communication with the first outlet 136, and the second outlet 156 is in fluid communication with the third cylinder 120. For example, a fluid pipeline may be provided between the second inlet 154 and the first outlet 136, and/or a fluid pipeline may be provided between the second outlet 156 and the third cylinder 120. In an embodiment, the second inlet 154 is provided with a check valve 158, and the check valve 158 allows pressurized gas provided through the second inlet 154 to move upstream to enter the second chamber 151 only. In addition, the second outlet 156 is provided with a check valve 160, and the check valve 160 allows gas to be discharged only through the second outlet 156 downstream from the second chamber 151. In an embodiment, the second cylinder 118 further includes a second piston rod 162. The second piston rod 162 includes a second piston cup 164 matching the second piston bush 150. The second piston cup 164 may be made of a rubber material, and, therefore, may be referred to herein as a second piston rubber cup. The second piston rubber cup 164 is configured to seal the second piston bush 150 together with the second cylinder cover 152. The second piston rod 162 can drive the second piston rubber cup 164 to reciprocate in the second chamber 151 so as to continuously draw pressurized gas from the first chamber 131 through the second inlet 154 and discharge the pressurized gas through the second outlet 156. In an embodiment, the second piston rod 162 and the first piston rod 142 are fixedly connected to each other, and the orientations of the second piston rod 162 and the first piston rod 142 (in FIG. 6B, the first piston rod 142 is directed towards the right, and the second piston rod 162 is directed towards the left) are opposite, so that when the first piston rod 142 draws gas into the first chamber 131 through the first inlet 134, the second piston rod 162 discharges gas out of the second chamber 151 through the second outlet 156 (in a state shown in FIG. 6B), and when the first piston rod 142 discharges pressurized gas out of the first chamber 131 through the first outlet 136, the second piston rod 162 draws, through the second inlet 154, the pressurized gas discharged out of the first chamber 131 into the second chamber 151. In this case, the gas can be pressurized stage by stage through the first cylinder 116 and the second cylinder 118. In other words, the second piston rod 162 may move in a leftward and rightward direction, respectively, based on the orientation as shown in FIG. 6B, resulting in the second piston rubber cup 164 moving toward and away from the second cylinder cover 152, respectively.

Still referring to FIG. 6B, as shown in FIG. 6B, the third cylinder 120 includes a third piston bush 170 defining a third chamber 171 and a third cylinder cover 172 sealingly connected to the third piston bush 170. The third chamber 171 may be partially delimited by the third piston bush 170 and may be partially delimited by the third cylinder cover 172. The third cylinder cover 172 includes a third inlet 174 (shown in FIG. 5) and a third outlet 176, and the third outlet 176 is in fluid communication with the gas outlet 114 through a passage 177 located in the third cylinder cover 172. In an embodiment, the third outlet 176 is provided with a check valve 180, and the check valve 180 allows gas to be discharged only from the third chamber 171. In an embodiment, the third cylinder 120 further includes a third piston rod 182. The third piston rod 182 includes a third piston cup 184 matching the third piston bush 170. The third piston cup 184 may be made of a rubber material, and, therefore, may be referred to herein as a third piston rubber cup. The third piston rubber cup 184 is configured to seal the third piston bush 170 together with the third cylinder cover 172. The third piston rod 182 can drive the third piston rubber cup 184 to reciprocate in the third chamber 171 so as to continuously draw gas from the second chamber 151 through the third inlet 174 and discharge pressurized gas through the third outlet 176. In other words, the third piston rod 182 may move in a leftward and rightward direction, respectively, based on the orientation as shown in FIG. 6B resulting in the third piston rubber cup 184 moving toward and away from the third cylinder cover 172, respectively.

In some embodiments, the third cylinder 120, the second cylinder 118, and the first cylinder 116 are configured to have substantially the same structure, and gradually pressurize inflowing gas in a similar manner until a desired pressure is reached. It can be understood that in some other embodiments, these cylinders may also be configured to have different structures or have different maximum volumes, or cylinders in more stages may be provided for stage-by-stage pressurization. In some embodiments, respective maximum volumes of the first chamber 131, the second chamber 151, and the third chamber 171 of the first cylinder 116, the second cylinder 118, and the third cylinder 120, respectively, are decreasing, so that after entering the second chamber 151, the gas discharged out of the first chamber 131 is further compressed due to a difference between the maximum volume of the first chamber 131 and the maximum volume of the second chamber 151, and that after entering the third chamber 171, the gas discharged out of the second chamber 151 is further compressed due to a difference between the maximum volume of the second chamber 151 and the maximum volume of the third chamber 171. In some embodiments, the maximum volume of the first chamber 131 may be approximately four times the maximum volume of the second chamber 151, and the maximum volume of the second chamber 151 may be approximately twice the maximum volume of the third chamber 171. Those skilled in the art can configure other maximum volume ratios, and this is not limited in the present disclosure.

The multi-stage electric gas pump shown in FIGS. 6A and 6B can provide pressures up to 7 MPa, 6 MPa, 5 MPa, 4 MPa, 3 MPa, 2 MPa, and 1 MPa or negative pressures approximately 95 kPa, 85 kPa, 75 kPa, 65 kPa, 55 kPa, 45 kPa, 35 kPa, and 25 kPa, for example.

FIG. 7 shows a perspective view of a portable assembly of a pressure measurement device according to an embodiment of the present disclosure. The portable assembly 700 includes a strap (not shown), a buckle latch 701, and a buckle base 702. The buckle latch 701 is located on an end portion of the strap. The buckle base 702 is formed on a housing of a pressure measurement device 1000. The buckle latch 701 is detachably connected to the buckle base 702.

In various aspects, a pressure measurement device may thus be summarized as being configured to adjust a gas pressure in an external gas cavity fluidly coupled thereto and measure the adjusted gas pressure in the external gas cavity. The pressure measurement device may be summarized as including a port, the pressure measurement device being fluidly coupled to the external gas cavity through the port; a pressure control module, coupled to the port through a gas passage, and configured to operably provide pressurized gas to the external gas cavity or draw gas from the external gas cavity so as to generate depressurized gas in the external gas cavity; a port pressure sensor, coupled to the port, and configured to measure a gas pressure at the port; and a gas discharging port, coupled to the port and the pressure control module, and configured to operably discharge gas from the port or the pressure control module to an external environment.

The gas passage may include a first proportional valve and a first isolation valve, coupled in series between the pressure control module and the port, wherein when the pressure control module provides pressurized gas to the external gas cavity or draws gas from the external gas cavity, the first proportional valve and the first isolation valve may be opened to allow gas to flow between the external gas cavity and the pressure control module, so that the pressurized gas or the depressurized gas may be formed in the external gas cavity.

The gas passage may further include a second proportional valve, coupled between the gas discharging port and the port, and configured to be opened in cooperation with the first proportional valve to enable the gas to be discharged from the port through the gas discharging port.

The gas passage may further include a second isolation valve, coupled between the gas discharging port and the pressure control module, and configured to be opened so as to discharge gas from the pressure control module through the gas discharging port.

The pressure control module may include a gas pump. The gas pump may be a multi-stage electric gas pump, and the multi-stage electric gas pump may include a driving mechanism; an eccentric shaft comprising a main body having a longitudinal axis, a first eccentric portion, and a second eccentric portion, wherein the first eccentric portion and the second eccentric portion may be fixed on the main body; the eccentric shaft may be driven by the driving mechanism to produce a first circular movement of the first eccentric portion performed around the longitudinal axis and a second circular movement of the second eccentric portion performed around the longitudinal axis, wherein the second circular movement may be synchronized with the first circular movement; a first cylinder comprising a first chamber and a first piston rod, and the first piston rod being connected to the first eccentric portion and configured to reciprocate in response to the first circular movement of the first eccentric portion so as to periodically pressurize gas drawn into the first chamber from an external environment of the multi-stage electric gas pump and then discharge first pressurized gas out of the first chamber; a second cylinder, being in fluid communication with the first cylinder, the second cylinder may include a second chamber and a second piston rod, and the second piston rod being connected to the first eccentric portion and configured to reciprocate in response to the first circular movement of the first eccentric portion so as to periodically pressurize the first pressurized gas drawn into the second chamber from the first chamber of the first cylinder and then discharge second pressurized gas out of the second chamber; and a third cylinder, being in fluid communication with the second cylinder, the third cylinder may include a third chamber and a third piston rod, and the third piston rod being connected to the second eccentric portion and configured to reciprocate in response to the second circular movement of the second eccentric portion so as to periodically pressurize the second pressurized gas drawn into the third chamber from the second chamber of the second cylinder and then discharge third pressurized gas out of the third chamber.

The pressure measurement device may further include a support frame, an elastic gasket, and a flexible tube, wherein the support frame accommodates the gas pump, and the gas pump may be connected to the support frame through the elastic gasket; and the gas pump may be in fluid communication with the pressure control module through the flexible tube.

The pressure control module may further include a gas-liquid separation device; the gas-liquid separation device may include a cavity and a liquid discharging port, the cavity being formed by a plurality of curved flow passages communicating with each other; after the gas enters the gas-liquid separation device, part of the gas contacts a wall surface of the cavity and then condenses into a liquid; and the liquid may be discharged from the liquid discharging port.

The pressure control module may further include a pressure measurement module connection port, and the pressure measurement module may be detachably coupled to the pressure measurement module connection port.

The pressure measurement device may further include a portable assembly, wherein the portable assembly may include a strap, a buckle latch, and a buckle base; the buckle latch may be located on an end portion of the strap; the buckle base may be formed on a housing of the pressure measurement device; and the buckle latch may be detachably connected to the buckle base.

It should be noted that although the mechanical components and the operation of the pressure measurement device of the present disclosure are described in detail in the above embodiments, those skilled in the art could understand that the pressure measurement device of the present disclosure may further include electrical assemblies such as a microcontroller, a signal processing circuit, a power supply circuit, etc., and that these electrical assemblies can cooperate with or support the operation of the mechanical components in the pressure measurement device, which will not be repeatedly described herein.

Various embodiments of the present disclosure are described above with reference to the accompanying drawings. Those skilled in the art understand that the solutions in the embodiments described above may be combined with each other. Those of ordinary skill in the art can understand and implement other variations of the disclosed embodiments by studying the specification, the disclosure, the accompanying drawings and the appended claims. In the claims, the word "comprise" does not exclude other elements or steps, and the word "a" or "an" does not exclude a plurality of elements or steps. In practical application of the present disclosure, one component may perform functions of multiple technical features recited in the description and claims.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A pressure measurement device, comprising:
    a port configured to be fluidly coupled to an external gas cavity;
    a pressure control module coupled to the port through a gas passage to adjust a gas pressure in the external gas cavity, wherein the pressure control module comprises a gas pump configured to provide pressurized gas to the external gas cavity;
    a gas discharging port coupled to the port and the pressure control module, and configured to operably discharge gas from the port or the pressure control module to an external environment when a gas pressure at the port is greater than a pressure threshold, wherein the pressure control module is configured to measure the gas pressure in the external gas cavity and adjust, via the port and the gas discharging port, the gas pressure in the external gas cavity;
    a support frame;
    an elastic gasket, and
    a flexible tube, wherein the support frame accommodates the gas pump, the gas pump is connected to the support frame through the elastic gasket, and the gas pump is in fluid communication with the pressure control module through the flexible tube.

2. The pressure measurement device according to claim 1, wherein the gas passage comprises:
    a first proportional valve and a first isolation valve coupled in series between the pressure control module and the port, wherein when the pressure control module provides pressurized gas to the external gas cavity or draws gas from the external gas cavity, the first proportional valve and the first isolation valve are configured to open to allow gas to flow between the external gas cavity and the pressure control module.

3. The pressure measurement device according to claim 2, wherein the gas passage further comprises:
    a second proportional valve coupled between the gas discharging port and the port, wherein the second proportional valve is configured to be opened in cooperation with the first proportional valve so as to enable gas to be discharged from the port through the gas discharging port when the gas pressure at the port is greater than the pressure threshold.

4. The pressure measurement device according to claim 2, wherein the gas passage further comprises:
    a second isolation valve coupled between the gas discharging port and the pressure control module, wherein the second isolation valve is configured to be opened so as to discharge gas from the pressure control module through the gas discharging port.

5. The pressure measurement device according to claim 1, wherein the gas pump is a multi-stage electric gas pump comprising:
    a driving mechanism; and
    an eccentric shaft including a main body having a longitudinal axis, a first eccentric portion, and a second eccentric portion,
    wherein the first eccentric portion and the second eccentric portion are fixed on the main body, the eccentric shaft is driven by the driving mechanism to produce a first circular movement of the first eccentric portion around the longitudinal axis and a second circular movement of the second eccentric portion around the longitudinal axis, and the second circular movement is synchronized with the first circular movement.

6. The pressure measurement device according to claim 5, wherein the gas pump further comprises:

a first cylinder including a first chamber and a first piston rod, the first piston rod being connected to the first eccentric portion and configured to reciprocate in response to the first circular movement of the first eccentric portion so as to periodically pressurize gas drawn into the first chamber from an external environment outside the multi-stage electric gas pump and then discharge first pressurized gas out of the first chamber;

a second cylinder in fluid communication with the first cylinder, the second cylinder including a second chamber and a second piston rod, the second piston rod being connected to the first eccentric portion and configured to reciprocate in response to the first circular movement of the first eccentric portion so as to periodically pressurize the first pressurized gas drawn into the second chamber from the first chamber of the first cylinder and then discharge second pressurized gas out of the second chamber; and a third cylinder in fluid communication with the second cylinder, the third cylinder including a third chamber and a third piston rod, the third piston rod being connected to the second eccentric portion and configured to reciprocate in response to the second circular movement of the second eccentric portion so as to periodically pressurize the second pressurized gas drawn into the third chamber from the second chamber of the second cylinder and then discharge third pressurized gas out of the third chamber.

7. The pressure measurement device according to claim 1, wherein:

the pressure control module further comprises a gas-liquid separation device that includes a cavity and a liquid discharging port, the cavity having a plurality of curved flow passages communicating with each other; and a wall surface of the cavity is arranged to condense gas in the gas-liquid separation device into a liquid that is directed to the liquid discharging port.

8. The pressure measurement device according to claim 1, wherein the pressure control module further comprises a pressure measurement module connection port, and a pressure measurement module is detachably coupled to the pressure measurement module connection port.

9. The pressure measurement device according to claim 1, further comprising a portable assembly that includes a strap, a buckle latch, and a buckle base, wherein the buckle latch is located on an end portion of the strap, the buckle base is formed on a housing of the pressure measurement device, and the buckle latch is detachably connected to the buckle base.

10. A system, comprising:

a pressure measurement device couplable to a gas cavity of a device under test (DUT), the pressure measurement device including:

a port configured to be in fluid communication with the gas cavity of the DUT;

a pressure control module fluidly coupled to the port to adjust a gas pressure in the gas cavity, wherein the pressure control module includes a gas pump configured to provide pressurized gas to the gas cavity; and a gas discharging port fluidly coupled to the port and the pressure control module, wherein the gas discharging port is configured to discharge gas from the port or the pressure control module;

a pressure measurement module connection port fluidly coupled to the port, the pressure control module, and the gas discharging port;

a first proportional valve and a first isolation valve coupled between the pressure control module and the port; and a second proportional valve and a second isolation valve coupled between the gas discharging port and the port; and a pressure measurement module detachably coupled to the pressure measurement module connection port, wherein the pressure measurement module is configured to measure gas pressure at the port, wherein the first proportional valve and the first isolation valve are configured to open to allow gas to flow between the gas cavity and the pressure control module when the pressure control module adjusts the gas pressure in the gas cavity, and wherein the second proportional valve and second isolation valve are configured to open in cooperation with the first proportional valve so as to enable gas to be discharged from the port through the gas discharging port when the pressure measurement module indicates that the gas pressure at the port is greater than a pressure threshold.

11. The system of claim 10, wherein the gas pump is a multi-stage electric gas pump that comprises:

a driving mechanism; and an eccentric shaft including a main body having a longitudinal axis, a first eccentric portion, and a second eccentric portion, wherein the first eccentric portion and the second eccentric portion are fixed on the main body, the eccentric shaft is driven by the driving mechanism to produce a first circular movement of the first eccentric portion around the longitudinal axis and a second circular movement of the second eccentric portion around the longitudinal axis, and the second circular movement is synchronized with the first circular movement.

12. The system of claim 11, wherein the gas pump further comprises:

a first cylinder including a first piston rod and a first chamber, the first piston rod being connected to the first eccentric portion and configured to reciprocate in response to the first circular movement of the first eccentric portion so as to periodically pressurize gas drawn into the first chamber from outside the multi-stage electric gas pump and then discharge first pressurized gas out of the first chamber;

a second cylinder in fluid communication with the first cylinder, the second cylinder including a second piston rod and a second chamber, the second piston rod being connected to the first eccentric portion and configured to reciprocate in response to the first circular movement of the first eccentric portion so as to periodically pressurize the first pressurized gas drawn into the second chamber from the first chamber of the first cylinder and then discharge second pressurized gas out of the second chamber; and a third cylinder in fluid communication with the second cylinder, the third cylinder including a third piston rod and a third chamber, the third piston rod being connected to the second eccentric portion and configured to reciprocate in response to the second circular movement of the second eccentric portion so as to periodically pressurize the second pressurized gas drawn into the third chamber from the second chamber of the second cylinder and then discharge third pressurized gas out of the third chamber.

13. The system of claim 10, wherein the pressure measurement device further includes:
a gas passage extending from the port to the pressure control module;
a first proportional valve positioned along the gas passage and fluidly coupled to the pressure control module;
a first isolation valve positioned along the gas passage and fluidly coupled in series to the first proportional valve along the gas passage between the pressure control module and the port, the first isolation valve being in fluid communication with the pressure control module through the first proportional valve positioned along the gas passage;
a second proportional valve positioned along the gas passage and fluidly coupled between the gas discharging port and the port; and
a second isolation valve positioned along the gas passage and fluidly coupled between the gas discharging port and the port.

14. The system of claim 13, wherein:
the first proportional valve and the first isolation valve are configured to be opened to allow gas to flow between the gas cavity and the pressure control module;
the second proportional valve is configured to be opened in cooperation with the first proportional valve to enable gas to be discharged from the port through the gas discharging port; and
the second isolation valve is configured to be opened so as to discharge gas from the pressure control module through the gas discharging port.

15. A pressure measurement device, comprising:
a port couplable in fluid communication with a gas cavity of a device under test;
a pressure control module fluidly coupled to the port to adjust a gas pressure in the gas cavity, wherein the pressure control module comprises a gas pump configured to provide pressurized gas to the gas cavity;
a gas discharging port fluidly coupled to the port and the pressure control module, wherein the gas discharging port is configured to discharge gas from the port or the pressure control module when a gas pressure at the port exceeds a pressure threshold; and
a pressure measurement module configured to measure gas pressure at the port, wherein the pressure measurement module is detachably coupled to the pressure measurement device;
wherein the gas pump is a multi-stage electric gas pump including:
a driving mechanism;
an eccentric shaft including a main body having a longitudinal axis, a first eccentric portion, and a second eccentric portion, wherein the first eccentric portion and the second eccentric portion are fixed on the main body, the eccentric shaft is driven by the driving mechanism to produce a first circular movement of the first eccentric portion around the longitudinal axis and a second circular movement of the second eccentric portion around the longitudinal axis, and the second circular movement is synchronized with the first circular movement;
a first cylinder including a first piston rod and a first chamber, the first piston rod being connected to the first eccentric portion and configured to reciprocate in response to the first circular movement of the first eccentric portion so as to periodically pressurize gas drawn into the first chamber from outside the multi-stage electric gas pump and discharge first pressurized gas out of the first chamber;
a second cylinder in fluid communication with the first cylinder, the second cylinder including a second piston rod and a second chamber, the second piston rod being connected to the first eccentric portion and configured to reciprocate in response to the first circular movement of the first eccentric portion so as to periodically pressurize the first pressurized gas drawn into the second chamber from the first chamber of the first cylinder and then discharge second pressurized gas out of the second chamber; and
a third cylinder in fluid communication with the second cylinder, the third cylinder including a third piston rod and a third chamber, the third piston rod being connected to the second eccentric portion and configured to reciprocate in response to the second circular movement of the second eccentric portion so as to periodically pressurize the second pressurized gas drawn into the third chamber from the second chamber of the second cylinder and then discharge third pressurized gas out of the third chamber.

16. The pressure measurement device of claim 15, further comprising:
a gas passage extending from the port to the pressure control module;
a first proportional valve positioned along the gas passage and fluidly coupled to the pressure control module; and
a first isolation valve positioned along the gas passage and fluidly coupled in series to the first proportional valve along the gas passage between the pressure control module and the port, the first isolation valve being in fluid communication with the pressure control module through the first proportional valve positioned along the gas passage.

17. The pressure measurement device of claim 16, further comprising:
a second proportional valve positioned along the gas passage and fluidly coupled between the gas discharging port and the port; and
a second isolation valve positioned along the gas passage and fluidly coupled between the gas discharging port and the port.

18. The pressure measurement device of claim 17, wherein:
the first proportional valve and the first isolation valve are configured to be opened to allow gas to flow between the gas cavity and the pressure control module;
the second proportional valve is configured to be opened in cooperation with the first proportional valve to enable gas to be discharged from the port through the gas discharging port; and
the second isolation valve is configured to be opened so as to discharge gas from the pressure control module through the gas discharging port.

* * * * *